(12) United States Patent
Chen et al.

(10) Patent No.: US 10,514,572 B2
(45) Date of Patent: Dec. 24, 2019

(54) LIQUID CRYSTAL DISPLAY DEVICE

(71) Applicant: Shenzhen China Star Optoelectronics Technology Co., Ltd., Shenzhen (CN)

(72) Inventors: Lixuan Chen, Shenzhen (CN); Zhenhua Sun, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 121 days.

(21) Appl. No.: 15/109,123

(22) PCT Filed: Jun. 15, 2016

(86) PCT No.: PCT/CN2016/085780
§ 371 (c)(1),
(2) Date: Jun. 30, 2016

(87) PCT Pub. No.: WO2017/193444
PCT Pub. Date: Nov. 16, 2017

(65) Prior Publication Data
US 2018/0101055 A1    Apr. 12, 2018

(30) Foreign Application Priority Data
May 11, 2016    (CN) .......................... 2016 1 0311728

(51) Int. Cl.
*G02F 1/1335*    (2006.01)
*G02F 1/13357*    (2006.01)

(52) U.S. Cl.
CPC ...... *G02F 1/133528* (2013.01); *G02F 1/1336* (2013.01); *G02F 1/133606* (2013.01);
(Continued)

(58) Field of Classification Search
CPC ............. G02F 1/1336; G02F 1/133528; G02F 1/133606; G02F 2001/133545; G02F 2001/133607
See application file for complete search history.

(56) References Cited

U.S. PATENT DOCUMENTS

2012/0280953 A1* 11/2012 Cheng ............... G02F 1/133524
                                                            345/204
2016/0109619 A1*  4/2016 Higeta ..................... C09B 31/30
                                                            359/487.02
2016/0306086 A1* 10/2016 Haag .................... G02B 5/3041

FOREIGN PATENT DOCUMENTS

CN         101071225 A       11/2007
CN         103838029 A        6/2014
CN         103838029 B    *   5/2016

* cited by examiner

*Primary Examiner* — Nathanael R Briggs
(74) *Attorney, Agent, or Firm* — Leong C. Lei

(57) ABSTRACT

The invention provides an LCD device, with both the upper polarizer and the lower polarizer having a multi-layer film structure, and comprising a plurality of stacked polarizing film units, with each comprising at least two layers of material films with different refraction index. The backlight module emits light to shine onto the upper and lower polarizers at a tilt angle, and the light is reflected and refracted a plurality of times at the interfaces inside the multi-layer film structure, and the S-polarized light and P-polarized light are separated completely to form linearly polarized light. Only the P-polarized light can pass. Compared to the conventional absorbing polymer polarizer, the upper and lower polarizers use a multi-layer film structure and the backlight module emitting light at a specific angle, so that the upper and lower polarizers provide high temperature stability, high humidity stability and high reliability, and simple to manufacture.

16 Claims, 2 Drawing Sheets

(52) U.S. Cl.
CPC ............ *G02F 2001/133545* (2013.01); *G02F 2001/133607* (2013.01)

LIQUID CRYSTAL DISPLAY DEVICE

BACKGROUND OF THE INVENTION

1. Field of the Invention

The present invention relates to the field of display, and in particular to a liquid crystal display (LCD) device.

2. The Related Arts

The liquid crystal display (LCD) and organic light-emitting diode (OLED) display have the advantages of thinness, low power-consumption, and no radiation, and are widely used in applications, such as, mobile phone, LCD-TV, personal digital assistant (PDA), digital camera, notebook PC, desktop PC, and so on, and become the mainstream display technology.

The majority of the LCD devices are of the backlight type, which comprises an LCD panel and a backlight module. The operation theory of the LCD device is to utilize the optical characteristics and birefringence of the liquid crystal. By using a voltage to control the rotation of liquid crystal to make the linearly polarized light from the lower polarizer rotate and emit from the upper polarizer (perpendicular to the polarization direction of the upper polarizer), the upper and lower polarizers and the liquid crystal cell function as a light switch. Therefore, a polarizer must be attached respectively to the upper and the lower sides of the LCD panel.

The conventional polarizer is mainly an absorbing polymer polarizer, which achieves polarization by adding material having a polarizing effect to the polymer film. The operation principle of polarization is as follows. Because the light wave is a shear wave, whose vibration direction is perpendicular to the propagation direction, the component of the light having the same polarization direction as the polarizer can pass, and the component having the polarization direction perpendicular to the polarizer will be absorbed by the polarizer. Therefore, the light passing the polarizer will become a linearly polarized light. The polymer polarizer, based on the molecular type absorbed by the polarizer, can generally be divided into two categories: iodine-based polarizer, and dye-based polarizer. The iodine-based polarizer has the advantages of high transmittance and high degree of polarization, but has poor tolerance to high temperature and high humidity. The dye-based polarizer has the disadvantages of low transmittance and low degree of polarization, but has good tolerance to high temperature and high humidity. It is therefore desirable to provide an LCD device to address the above problems.

SUMMARY OF THE INVENTION

The object of the present invention is to provide an LCD device, with the upper and lower polarizers having a multi-layer film structure and the backlight module emitting light at a specific angle, so that the upper and lower polarizers provide high temperature stability, high humidity stability and high reliability, as well as simple to manufacture.

To achieve the above object, the present invention provides an LCD, which comprises: a backlight module, an LCD panel disposed above the backlight module, an upper polarizer disposed at the LCD panel on a side away from the backlight module, and a lower polarizer disposed at the LCD panel on a side near the backlight module; both the upper polarizer and the lower polarizer having a multi-layer film structure, and comprising a plurality of stacked polarizing film units, the polarizing film unit comprising at least two layers of material films with different refraction index; and the backlight module emitting light onto the upper polarizer and the lower polarizer at a tilt angle.

The upper polarizer and the lower polarizer are formed respectively on the upper and lower surfaces of the LCD panel by vapor deposition, sputtering, or spin coating process.

Both the upper polarizer and the lower polarizer comprise 20-100 layers of material films.

The material films in the polarizing film unit are metal films.

The optical thickness of each material film in the polarizing film unit is 100 nm-400 nm.

The polarizing film unit comprises two layers of material films having different refraction index, which are a first polarizing material film and a second polarizing material film.

The first polarizing material film and the second polarizing material film have the optical thickness ratio of 1:0.6-1.5.

The first polarizing material film and the second polarizing material film have the same optical thickness.

The first polarizing material film and the second polarizing material film have the optical thickness ratio of 0.8:1.2.

The first polarizing material film has the refraction index 1.2-1.5, and the second polarizing material film has the refraction index 1.7-2.3.

The present invention also provides an LCD, which comprises: a backlight module, an LCD panel disposed above the backlight module, an upper polarizer disposed at the LCD panel on a side away from the backlight module, and a lower polarizer disposed at the LCD panel on a side near the backlight module; both the upper polarizer and the lower polarizer having a multi-layer film structure, and comprising a plurality of stacked polarizing film units, the polarizing film unit comprising at least two layers of material films with different refraction index; and the backlight module emitting light onto the upper polarizer and the lower polarizer at a tilt angle; wherein the upper polarizer and the lower polarizer are formed respectively on the upper and lower surfaces of the LCD panel by vapor deposition, sputtering, or spin coating process; wherein both the upper polarizer and the lower polarizer comprise 20-100 layers of material films; wherein the material films in the polarizing film unit are metal films; and wherein the optical thickness of each material film in the polarizing film unit is 100 nm-400 nm.

Compared to the known techniques, the present invention provides the following advantages: the present invention provides an LCD device, with both the upper polarizer and the lower polarizer having a multi-layer film structure, and comprising a plurality of stacked polarizing film units, the polarizing film unit comprising at least two layers of material films with different refraction index. The light is reflected and refracted a plurality of times at the interfaces inside the multi-layer film structure, and the S-polarized light and P-polarized light are separated completely so as to form linearly polarized light. The backlight module emits the light to shine onto the upper and lower polarizers at a tilt angle, and the light is reflected and refracted a plurality of times at the interfaces inside the multi-layer film structure, and the S-polarized light and P-polarized light are separated completely so that only the P-polarized light can pass. Compared to the conventional absorbing polymer polarizer, the upper and lower polarizers use a multi-layer film structure and the backlight module emitting light at a specific angle, so that the upper and lower polarizers provide high temperature stability, high humidity stability and high reliability, as well as simple to manufacture.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
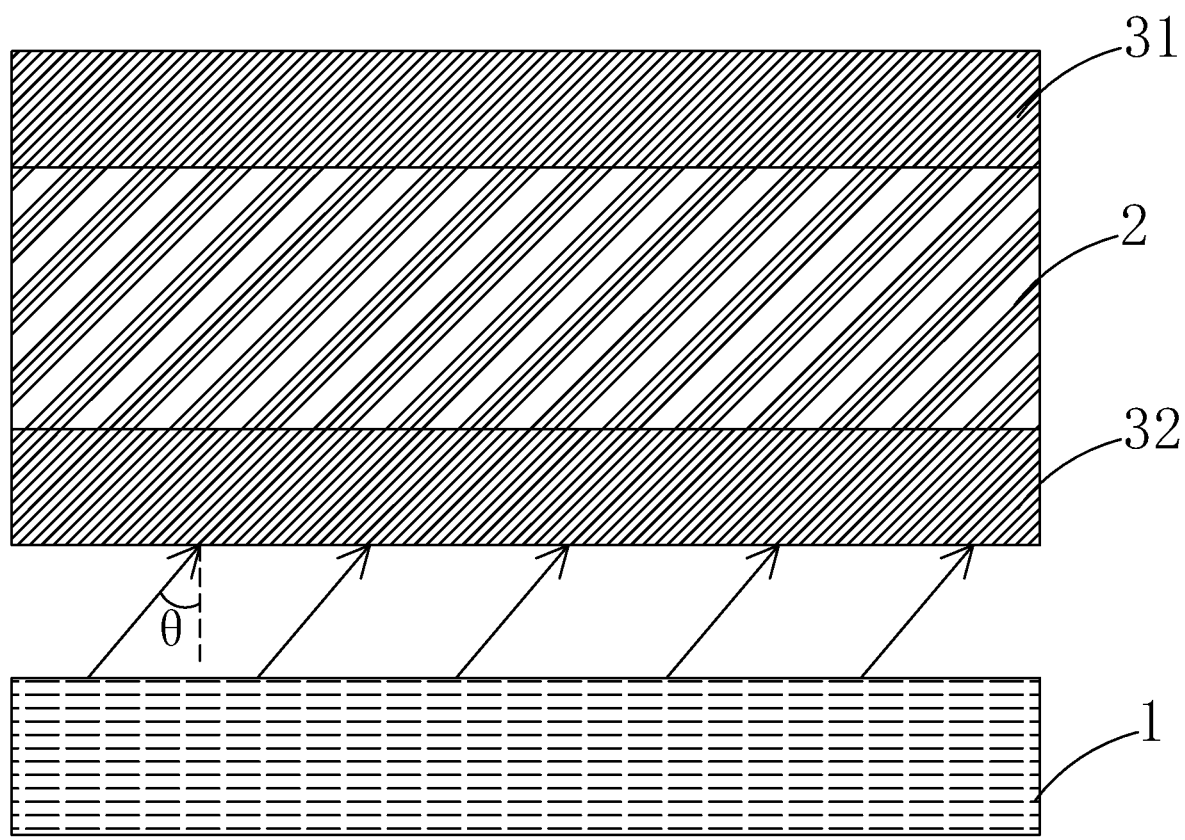
FIG. 1 is a schematic view showing the structure of the LCD device provided by an embodiment of the present invention.

Refer to FIG. 1. The present invention provides an LCD, which comprises: a backlight module 1, an LCD panel 2 disposed above the backlight module 1, an upper polarizer 31 disposed at the LCD panel 2 on a side away from the backlight module 1, and a lower polarizer 32 disposed at the LCD panel 2 on a side near the backlight module 1.

Specifically, both the upper polarizer and the lower polarizer have a multi-layer film structure, and comprise a plurality of stacked polarizing film units 300, the polarizing film unit 300 comprising at least two layers of material films with different refraction index.

Specifically, the vibration direction and the propagation direction of the light wave are perpendicular to each other, and the light can be divided into a P component and an S component, wherein the P component lies in the plane formed by the incident light and the normal, i.e., in the incident light plane, and the S component is perpendicular to the plane formed by the incident light and the normal. The polarization state will change when the natural light is reflected by an interface; specifically, when the incident light enters at the Brewster angle, the reflected light will be completely linearly polarized light, which is the S-polarized light with vibration direction perpendicular to the incident plane, and the transmitted light will be partially linearly polarized light. As a result, after the light is reflected and refracted a plurality of times at the interfaces inside the multi-layer film structure of the upper polarizer 31 and the lower polarizer 32, the S-polarized light and P-polarized light are separated completely. Therefore, the upper polarizer 31 and the lower polarizer 32 having a multi-layer film structure can also function as conventional polarizer to polarize light.

Specifically, after the light emitted by the backlight module 1 shining at a tilt angle onto the lower polarizer 32 is reflected and refracted a plurality of times at the interfaces inside the lower polarizer 32, only the P-polarized light can pass.

Specifically, the incident angle θ of the light emitted by the backlight module 1 shining at a tilt angle onto the lower polarizer 32 is determined by the optical characteristics of the multi-layer structure of the upper polarizer 31 and the lower polarizer 32.

Specifically, the upper polarizer 31 and the lower polarizer 32 are formed respectively on the upper and lower surfaces of the LCD panel 2 by vapor deposition, sputtering, or spin coating process. The manufacturing process is simpler.

Specifically, both the upper polarizer 31 and the lower polarizer 32 comprise 20-100 layers of material films.

Preferably, the material films in the polarizing film unit 300 are metal films, and the metal films of the upper polarizer 31 and the lower polarizer 32 are formed respectively on the upper and lower surfaces of the LCD panel 2 by vapor deposition, sputtering, or spin coating process. Compared to conventional polarizers, the obvious advantage is to provide high temperature stability, high humidity stability and reliable, as well as simple to manufacture.

Specifically, the optical thickness (the multiplication of the refraction index and the physical thickness of the film) of each material film in the polarizing film unit 300 is 100 nm-400 nm.

Figure 2:
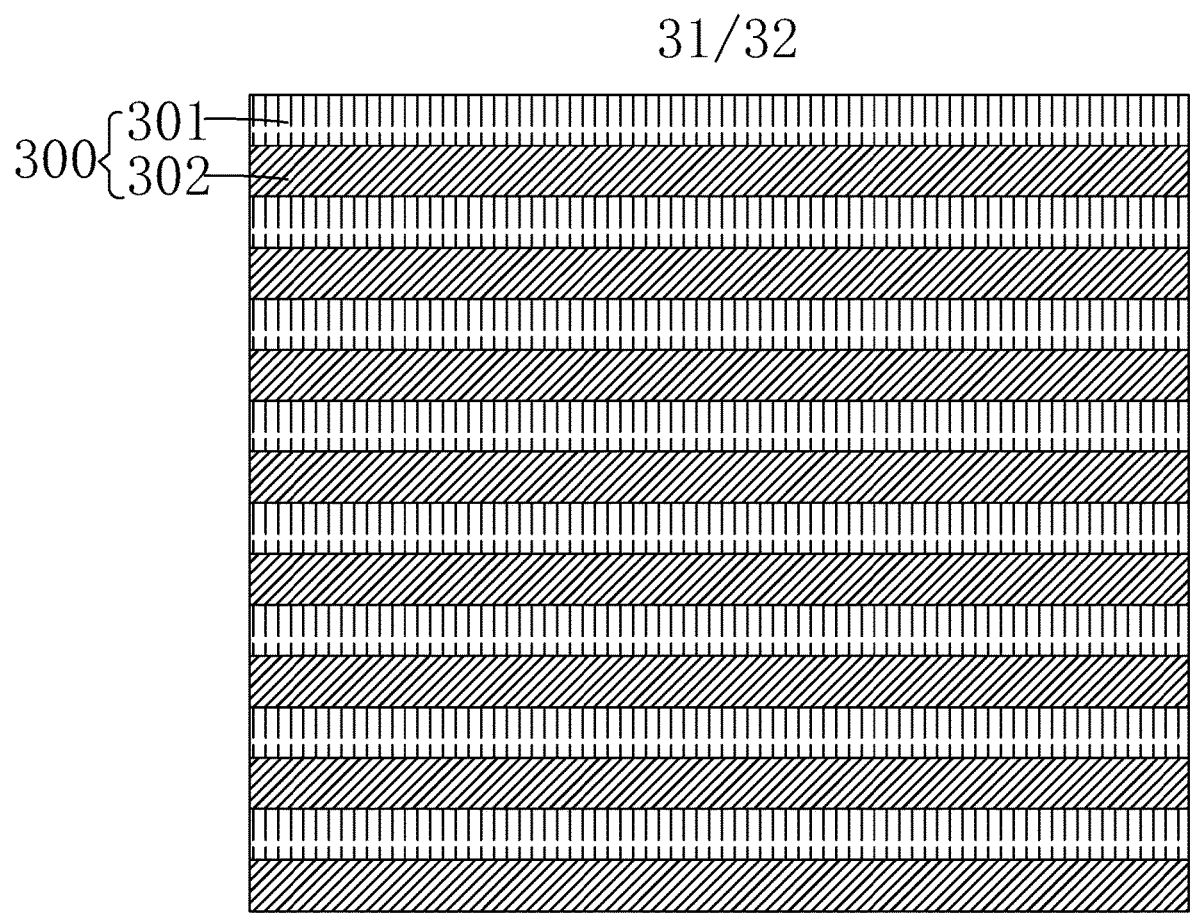
FIG. 2 is a schematic view showing the structure of the upper and lower polarizers of the LCD device provided by an embodiment of the present invention.

Specifically, as shown in FIG. 2, the polarizing film unit 300 comprises two layers of material films having different refraction index, which are a first polarizing material film 301 and a second polarizing material film 302.

Specifically, the first polarizing material film 301 and the second polarizing material film 302 can have similar optical thickness; however, the optical thickness ratio can also be adjusted, for example, the first polarizing material film 301 and the second polarizing material film 302 have the optical thickness ratio of 0.8:1.2.

Specifically, the first polarizing material film and the second polarizing material film have the optical thickness ratio of 1:0.6-1.5.

Preferably, the first polarizing material film and the second polarizing material film have the same optical thickness.

Specifically, the first polarizing material film has the refraction index 1.2-1.5, and the second polarizing material film has the refraction index 1.7-2.3.

It should be noted that the operation of the LCD device of the present invention is as follows. The backlight module 1 starts to emit light, and the emitted light shines at a specific tilt angle onto the lower polarizer 32 at the lower surface of the LCD panel 2. After the emitted light is reflected and refracted a plurality of times at the interfaces inside the lower polarizer 32, the S-polarized light and the P-polarized light are completely separated, and only the P-polarized light can pass so as to achieve polarization. Moreover, the upper polarizer 31 and the lower polarizer 32 are formed respectively on the upper and lower surfaces of the LCD panel 2 by vapor deposition, sputtering, or spin coating process, which is simpler to manufacture.

In summary, the present invention provides an LCD device, with both the upper polarizer and the lower polarizer having a multi-layer film structure, and comprising a plurality of stacked polarizing film units, the polarizing film unit comprising at least two layers of material films with different refraction index. The light is reflected and refracted a plurality of times at the interfaces inside the multi-layer film structure, and the S-polarized light and P-polarized light are separated completely so as to form linearly polarized light. The backlight module emits the light to shine onto the upper and lower polarizers at a tilt angle, and the light is reflected and refracted a plurality of times at the interfaces inside the multi-layer film structure, and the S-polarized light and P-polarized light are separated completely so that only the P-polarized light can pass. Compared to the conventional absorbing polymer polarizer, the upper and lower polarizers use a multi-layer film structure and the backlight module emitting light at a specific angle, so that the upper and lower polarizers provide high temperature stability, high humidity stability and high reliability, as well as simple to manufacture.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claim of the present invention.

What is claimed is:

1. A liquid crystal display (LCD) device, which comprises: a backlight module, an LCD panel disposed above the backlight module, an upper polarizer disposed at the LCD panel on a side away from the backlight module, and a lower polarizer disposed at the LCD panel on a side near the backlight module;
    both the upper polarizer and the lower polarizer having a multi-layer film structure, and comprising a plurality of stacked polarizing film units, the polarizing film unit comprising two layers of material films with different refraction index; and
    the backlight module emitting light onto the upper polarizer and the lower polarizer at a tilt angle;
    wherein each of the upper and lower polarizers is of a stacked arrangement and has a first side adjacent to the LCD panel and a second, opposite side away from the LCD panel, each of the upper and lower polarizers comprising the plurality of polarizing film units stacked on each other from one of the first and second sides of the polarizer to another one of the first and second sides of the polarizer, wherein the plurality of polarizing film units are stacked in a repeated manner to form the stacked arrangement and the two layers of materials that form each of the polarizing film units alternate with each other, in an identical fashion, in the stacked arrangement from the first side to the second side, and the plurality of polarizing film units being all identical, such that a predetermined number of a first one of the two layers of materials and a predetermined number of a second one of the two layer of materials are identical; and
    wherein light is reflected and refracted multiple times at interfaces inside at least one of the upper and lower polarizers to allow a light component having a specific polarization to pass through the polarizer.

2. The LCD device as claimed in claim 1, wherein the upper polarizer and the lower polarizer are formed respectively on the upper and lower surfaces of the LCD panel by vapor deposition, sputtering, or spin coating process.

3. The LCD device as claimed in claim 1, wherein both the upper polarizer and the lower polarizer comprise 20-100 layers of material films.

4. The LCD device as claimed in claim 1, wherein the material films in the polarizing film unit are metal films.

5. The LCD device as claimed in claim 1, wherein the optical thickness of each material film in the polarizing film unit is 100 nm-400 nm.

6. The LCD device as claimed in claim 1, wherein the polarizing film unit comprises two layers of material films having different refraction index, which are a first polarizing material film and a second polarizing material film.

7. The LCD device as claimed in claim 6, wherein the first polarizing material film and the second polarizing material film have the optical thickness ratio of 1:0.6-1.5.

8. The LCD device as claimed in claim 7, wherein the first polarizing material film and the second polarizing material film have the same optical thickness.

9. The LCD device as claimed in claim 7, wherein the first polarizing material film and the second polarizing material film have the optical thickness ratio of 0.8:1.2.

10. The LCD device as claimed in claim 6, wherein the first polarizing material film has the refraction index 1.2-1.5, and the second polarizing material film has the refraction index 1.7-2.3.

11. A liquid crystal display (LCD) device, which comprises: a backlight module, an LCD panel disposed above the backlight module, an upper polarizer disposed at the LCD panel on a side away from the backlight module, and a lower polarizer disposed at the LCD panel on a side near the backlight module;
    both the upper polarizer and the lower polarizer having a multi-layer film structure, and comprising a plurality of stacked polarizing film units, the polarizing film unit comprising two layers of material films with different refraction index; and
    the backlight module emitting light onto the upper polarizer and the lower polarizer at a tilt angle;
    wherein each of the upper and lower polarizers is of a stacked arrangement and has a first side adjacent to the LCD panel and a second, opposite side away from the LCD panel, each of the upper and lower polarizers comprising the plurality of polarizing film units stacked on each other from one of the first and second sides of the polarizer to another one of the first and second sides of the polarizer, wherein the plurality of polarizing film units are stacked in a repeated manner to form the stacked arrangement and the two layers of materials that form each of the polarizing film units alternate with each other, in an identical fashion, in the stacked arrangement from the first side to the second side, and the plurality of polarizing film units being all identical, such that a predetermined number of a first one of the two layers of materials and a predetermined number of a second one of the two layer of materials are identical;
    wherein light is reflected and refracted multiple times at interfaces inside at least one of the upper and lower polarizers to allow a light component having a specific polarization to pass through the polarizer;
    wherein the upper polarizer and the lower polarizer are formed respectively on the upper and lower surfaces of the LCD panel by vapor deposition, sputtering, or spin coating process;
    wherein both the upper polarizer and the lower polarizer comprise 20-100 layers of material films;
    wherein the material films in the polarizing film unit are metal films; and
    wherein the optical thickness of each material film in the polarizing film unit is 100 nm-400 nm.

12. The LCD device as claimed in claim 11, wherein the polarizing film unit comprises two layers of material films having different refraction index, which are a first polarizing material film and a second polarizing material film.

13. The LCD device as claimed in claim 12, wherein the first polarizing material film and the second polarizing material film have the optical thickness ratio of 1:0.6-1.5.

14. The LCD device as claimed in claim 13, wherein the first polarizing material film and the second polarizing material film have the same optical thickness.

15. The LCD device as claimed in claim 13, wherein the first polarizing material film and the second polarizing material film have the optical thickness ratio of 0.8:1.2.

16. The LCD device as claimed in claim 12, wherein the first polarizing material film has the refraction index 1.2-1.5, and the second polarizing material film has the refraction index 1.7-2.3.

* * * * *